(12) United States Patent
Gaubatz

(10) Patent No.: US 6,732,624 B1
(45) Date of Patent: May 11, 2004

(54) CUTTING DEVICE

(76) Inventor: Heinz Gaubatz, Feldstrasse 37, Dietzenbach 63128 (DE)

( * ) Notice: Subject to any disclaimer, the term of this patent is extended or adjusted under 35 U.S.C. 154(b) by 0 days.

(21) Appl. No.: 09/364,167

(22) Filed: Jul. 30, 1999

(30) Foreign Application Priority Data

Jul. 30, 1998 (DE) ..................................... 298 13 528 U

(51) Int. Cl.[7] .......................... B26D 7/02; B25B 11/00
(52) U.S. Cl. ............................. 83/451; 83/56; 83/613; 269/21
(58) Field of Search ................... 279/3; 269/20, 269/21, 289 R; 83/56, 451, 613, 881; 451/5, 9, 12, 41

(56) References Cited

U.S. PATENT DOCUMENTS

| | | | |
|---|---|---|---|
| 3,777,604 A | | 12/1973 | Gerber |
| 3,865,359 A | * | 2/1975 | Caroli .......................... 269/21 |
| 4,301,999 A | * | 11/1981 | Higgins et al. ................ 269/21 |
| 4,906,011 A | * | 3/1990 | Hiyamizu et al. ......... 269/21 X |
| 6,173,948 B1 | * | 1/2001 | Hall et al. .................... 269/21 |

FOREIGN PATENT DOCUMENTS

| | | |
|---|---|---|
| DE | 36 20 853 A | 12/1987 |
| DE | 196 04 616 A | 8/1996 |
| EP | 0 761 110 A | 3/1997 |
| GB | 1 286 312 A | 8/1972 |
| GB | 2 057 956 A | 4/1981 |

* cited by examiner

*Primary Examiner*—W. Donald Bray
(74) *Attorney, Agent, or Firm*—Alix, Yale & Ristas, LLP

(57) ABSTRACT

The invention pertains to a cutting device, particularly for the cutting of predetermined breaking points in plastic membranes, foils or the like, with an air-permeable supporting surface for the plastic membrane or the like and with an aspirating device, with which the plastic membrane or the like is applied onto the supporting surface. The supporting surface is formed by a sintered metal plate.

4 Claims, 6 Drawing Sheets

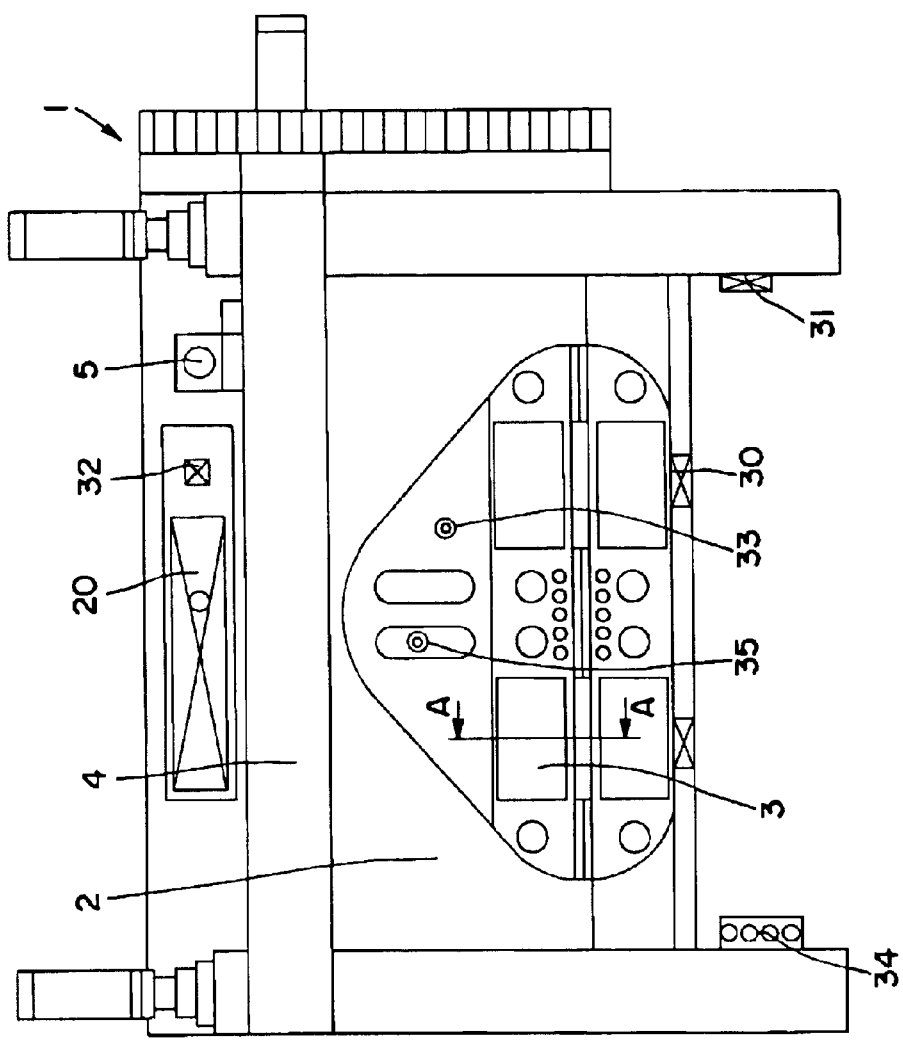
FIG. 1
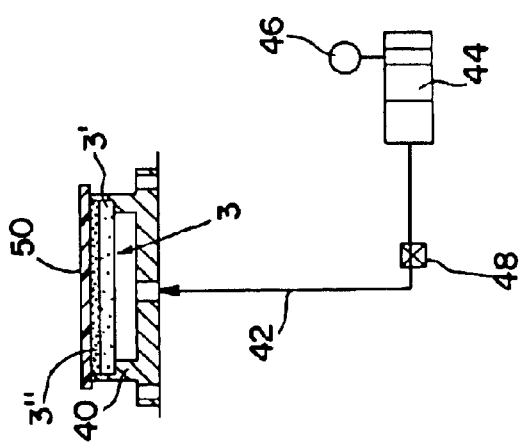
FIG. 1.1

CUTTING DEVICE

BACKGROUND OF THE INVENTION

This invention concerns a cutting device, particularly for the cutting of predetermined breaking points in plastic membranes, foils or the like, with an air-permeable supporting surface for the plastic membrane or the like, and with an aspirating device, with which the plastic membrane or the like is forced onto the supporting surface.

Plastic membranes or foils are presently utilized in multiple forms. Thus, dashboards of motor vehicles are covered with plastic membranes. Usually airbags for the driver and the passenger next to the driver are integrated into these dashboard panels. Whereas the airbag for the driver is accommodated in the steering wheel, the airbag for the passenger is found behind the dashboard and is covered by an airbag cover. Usually, the airbag cover is covered with a separate plastic membrane and placed over a visible slot in the other part of the dashboard, in order to be able to open simply in the case when the airbag is triggered, and, if necessary, to make possible an exchange of the airbag. Since in the case of a crash, in which the airbag is released, but the entire dashboard need not be replaced, for design reasons, one aims at covering the dashboard with a permeable plastic membrane, by which the airbag is also covered. In order to assure that the airbag can open reliably in the case of a crash, a predetermined breaking point must be formed in the covering membrane, which makes it possible for the airbag cushion to break through the plastic membrane at a specific place.

It has already been attempted to produce this predetermined breaking point by means of a laser by introducing an incision on the back side of the plastic membrane. In the case of laser cutting of the plastic membrane, however, undesired vapors are formed, which must be drawn off. For cutting, the plastic membrane is aspirated or suctioned onto a perforated plate. However, there is the danger that the plastic membrane is applied non-uniformly to the perforated plate, so that the depth of the laser cut varies. If the cut, in which the plastic membrane is only 1 to 1.5 mm thick, however, is too deep, then the predetermined breaking point with time is discernible on the outside of the dashboard, and the desired design effect is destroyed. Also, in the case of such a safety component, a defined residual wall thickness must be assured.

SUMMARY OF THE INVENTION

The objective of the invention is thus to avoid the disadvantages that occur in the state of the art and to make possible a more reliable cutting of the plastic membrane.

This objective is essentially resolved with the invention in that the supporting surface is formed by a sintered metal plate. The sintered metal plate has a multiple number of small pores, which make possible a very large aspiration or suction surface with only minimal surface unevenness. In this way, it is assured that the plastic membrane is applied absolutely flatly onto the supporting surface.

According to a preferred embodiment of the invention, the sintered metal plate is built up of several layers, particularly two layers, whereby the upper layer turned toward the plastic membrane or the like, has a finer grain-size distribution than the lower layer. The lower layer of coarser grain size allows for the aspiration of sufficient air, while the upper, small-grained layer assures a uniform distribution of the aspiration effect, and the unevenness of the plastic membrane on the surface of the sintered metal plate is reduced to a minimum.

Appropriately, the sintered metal plate is introduced into a space, which has a vacuum connection. In this way, a uniform suction is assured over the entire surface of the sintered metal plate.

According to the invention, vacuum monitor controls are provided for testing the suction force exerted on the plastic membrane or the like. If an insufficiently strong vacuum is present, then a complete supporting of the plastic membrane on the sintered metal surface cannot be guaranteed and the plastic membrane must be declared as waste.

According to a preferred configuration of the invention, the cutting device has a cutting head with a cutting knife that can be moved over the sintering plate. A purely mechanical cut by the cutting knife is achieved while avoiding the vapors that occur with laser cutting. The blade of the cutting knife is held in a knife holder so that it can be exchanged, so that a simple exchange is possible if there is too great a wear or damage of the blade.

In an improvement of this inventive concept, a measuring device is assigned to the cutting head, by means of which the thickness of the plastic membrane is measured. In this way, a quality control is made possible during the cutting.

Preferably, the measuring device is coupled with a measuring foot, which is spring loaded and is applied onto the plastic membrane or the like during the cutting process. The measuring foot travels along with the cutting knife on the plastic membrane and can thus determine uneven places in the membrane thickness. If these exceed the determined tolerance range, the plastic membrane is worthless. The correct alignment of the sintered metal plate can also be tested by the measuring foot prior to the beginning of the cutting process. For this purpose, the sliding foot is pressed against the sintered metal plastic at several places, in order to recognize a possible inclination of the sintered metal plate. Such an inclination can then be compensated for by means of the CNC control of the cutting device in such a way that the travel path of the cutting knife is adapted to the inclination of the sintered metal plate.

The measuring foot and the cutting knife can be displaced independently of one another according to the invention. Since a uniform residual wall thickness of the plastic membrane will be achieved, the cutting knife must be moved at constant distance, for example 0.5 mm, over the sintered metal plate. The measuring foot, on the other hand, must take into consideration possible unevennesses of the plastic membrane, which can be accomplished due to its spring loading.

In an improvement of the invention, a sliding foot is attached, in a detachable manner, preferably by means of an exchange head, on the side of the measuring foot turned toward the plastic membrane or the like. In this way, a simple exchange of the sliding foot is made possible in case of wear or damage.

In order to minimize the friction resistances during the sliding on the plastic membrane or the like, the sliding foot-has Teflon™ coating or the like, reinforced with fiberglass if needed.

The cutting device according to the invention also has a memory device, in which the data of the membrane thickness measured during the cutting process and/or corresponding theoretical set values can be stored. The memory values can be off-loaded at regular intervals, for example, once a week, into a permanent storage, for example, a writable CD.

Since the quality of the cut in the plastic membrane or the like and thus the safety-relevant properties of the predetermined breaking points essentially depend on the quality of the knife blade, the cutting device, in a particularly preferred form of embodiment of the invention, also has a preferably high-resolution camera, with which the cutting blade can be checked with respect to degree of wear, alignment, breaks or the like. The blade of the cutting knife is checked by the camera and compared with pre-given set values, at regular intervals, for example, before and/or after each cut. A predetermined wear, insofar as it does not exceed an established tolerance range, can be taken into consideration by a corresponding Z-axis correction with the control of the travel path of the cutting blade.

In a further improvement of this inventive concept, a reference blade is assigned to the image section detected by the camera, in which the cutting knife blade is introduced. If the deviation of the blade measurements relative to the reference blade are greater than an established tolerance, then the blade must be exchanged and the last cut plastic membrane or the like must be declared waste.

The cutting device according to the invention also has a bar code printer for introducing a bar code label onto the plastic membrane or the like after cutting. In this way, in the further processing of the plastic membrane, it can be checked whether a cutting process has been conducted and which one.

The cutting device also has an obliterating punch, with which plastic membranes or the like can be marked for waste, if, during their processing, a defect has appeared (insufficient vacuum, overly high deviations in membrane thickness, damage of the cutting knife blade). Then it is checked on subsequent machines whether such an obliterating punch is present and the plastic membrane or the like, as the case may be, is no longer further processed.

In order to increase the processing speed of the cutting device, according to the invention, a multiple number of cutting regions arranged next to one another, particularly four, are provided with sintered metal plates, which can be driven by the cutting head.

Further embodiments, advantages and application possibilities of the invention also result from the following description of one example of an embodiment and the drawings.

BRIEF DESCRIPTION OF THE DRAWINGS

FIG. 1 shows a schematic top view onto a cutting device according to the invention;

FIG. 1.1 shows an enlarged section through a portion of the cutting device taken along the line A—A in FIG. 1 together with a schematic view of the vacuum system;

FIG. 4b shows a partial section along line A—A in FIG. 4a;

DETAILED DESCRIPTION OF THE PREFERRED EMBODIMENTS

Figure 2:
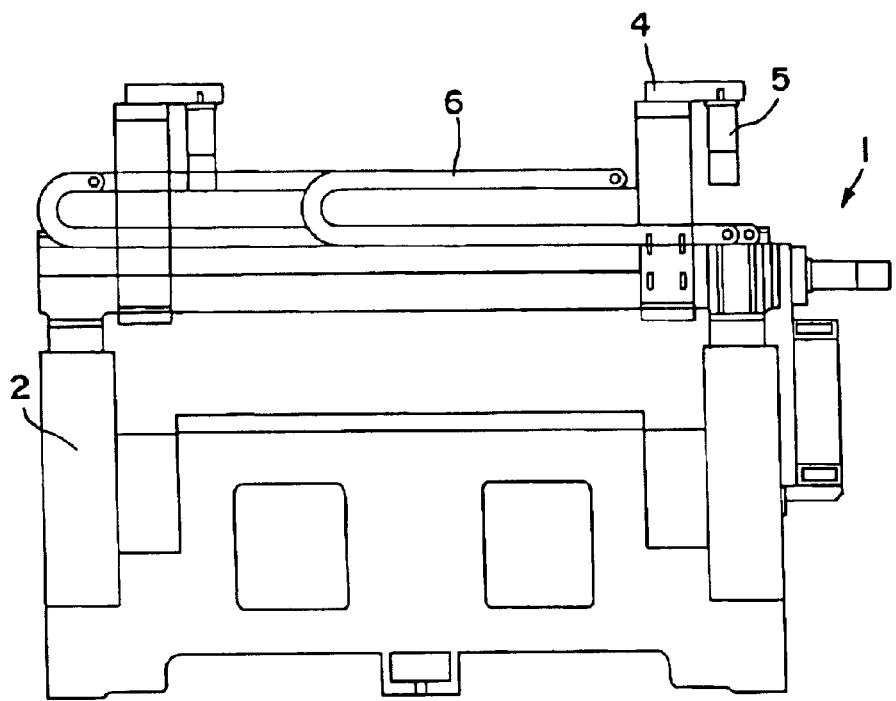
FIG. 2 shows a schematic front view of the cutting device according to FIG. 1.
Figure 3:
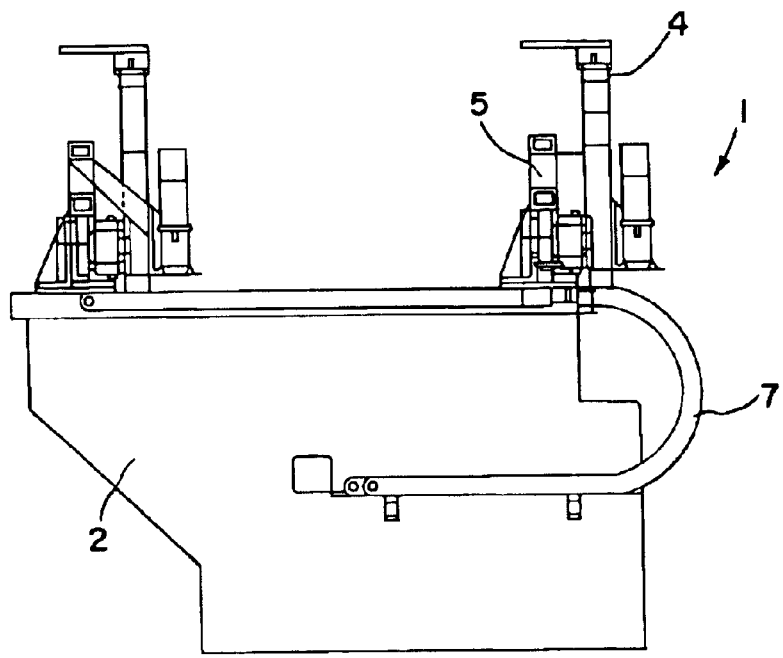
FIG. 3 shows a schematic side view of the cutting device according to FIG. 1.

The cutting device according to the invention is represented schematically in FIGS. 1 to 3. Four sintered metal plates 3 are arranged on a machine table 2 as the supporting surface for plastic membranes, foils or the like (shown schematically as 50 in FIG. 1.1).

With additional reference to FIG. 1.1, the sintered metal plates 3, in a preferred embodiment, are approximately 10 mm thick and are embedded in a steel frame. The frame has a wall thickness of approximately 3 mm and a central vacuum connection. With the frame, the sintered metal plate 3 comes to a total thickness of approximately 38 mm. Sintered metal plate 3 is constructed of two layers, whereby the lower layer 3' has a grain size of approximately 0.8 mm and is approximately 6 mm thick. This allows for sufficient aspiration of air. The upper layer 3" of sintered metal plate 3, on the other hand, has a smaller grain size of only approximately 0.3 mm and is approximately 4 mm thick. The upper layer serves for the uniform distribution of the vacuum effect and reduces to a minimum the unevenness on the surface of sintered metal plate 3.

Cutting device 1 has a toggle switch 30 and a control component 31 on machine table 2, by means of which the machine can be operated. The machine is installed by means of a setup block 32. In addition, cutting device 1 has an obliterating punch 33, with which plastic membranes or the like that are unusable can be designated as waste. Finally, a bar code printer 35 can be provided, with which information on the working process that has been conducted on the plastic membrane or the like can be introduced. A knife holder 34 is also provided, in which exchange knives or blades are retained.

A measuring and cutting head 5, which can be arbitrarily moved on machine table 2, is arranged on a guide block 4 on machine table 2. In FIGS. 2 and 3, the right halves of the figures with the solid lines indicate an initial position of the measuring and cutting head 5 and the left halves of the figure indicate by dot-dashes a travel position of measuring and cutting head 5. Guide block 4 with measuring and cutting head 5 is driven by means of power chains 6, 7.

Figure 4A:
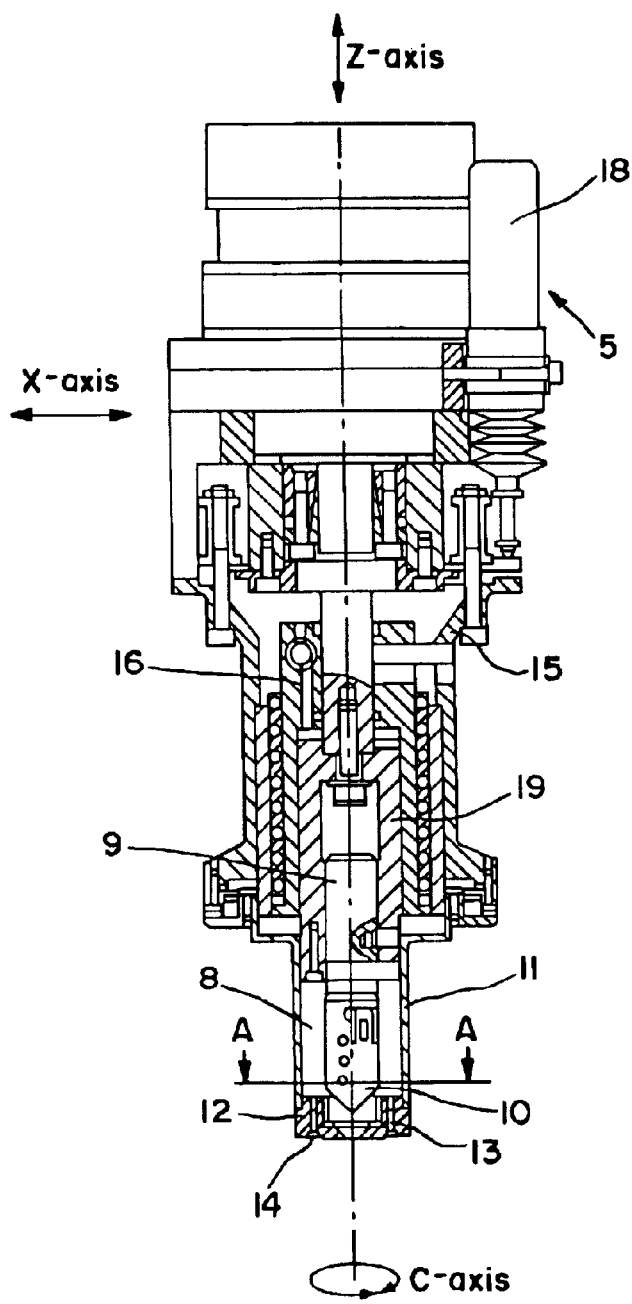
FIG. 4a shows a section through a measuring and cutting head and further designates certain axes.
Figure 4B:
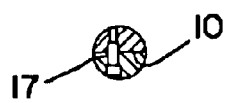

The measuring and cutting head 5 shown in more detail in FIG. 4 essentially has two moving elements independent of one another, i.e., a cutting knife 8 consisting of a knife holder 9 and a blade 10, and a measuring foot 11, on the lower end of which is introduced a sliding foot 14 by means of an exchange head 12 and fastening screws 13. Sliding foot 14 has a coating of Teflon™ or the like, which is reinforced with fiberglass if necessary, in order to reduce the friction forces during sliding. Measuring foot 11 is attached on a housing 15, which is spring loaded opposite a cylinder guide 16 of measuring and cutting head 5. A possible displacement of measuring foot 11 opposite an established zero position is detected by means of a measuring sensor 18.

A tool holder 19 is guided so that it moves within cylinder guide 16 of measuring and cutting head 5, and the knife holder 9 is fastened in this tool holder. Blade 10 of cutting knife 8 is attached in knife holder 9, for example by clamping between two clamping chucks 17 (see FIG. 4b).

Figure 5:
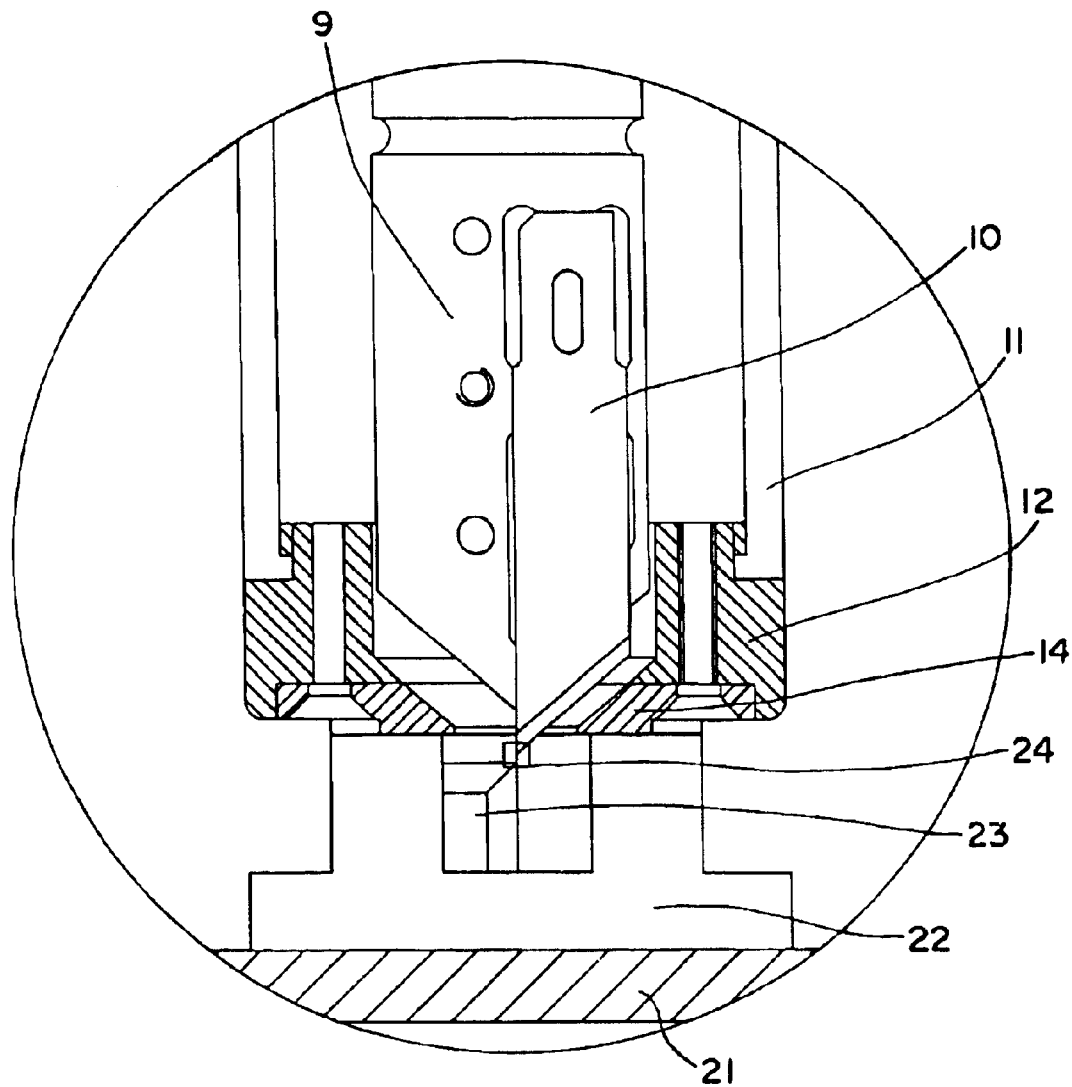
FIG. 5 shows schematically the construction for the blade measurement.

In order to check blade 10 of cutting knife 8, a preferably high-resolving measuring camera 20 is provided, which checks blade 10 on a camera table 21 (FIG. 5) by means of a reference blade 23 introduced on a holder 22. Reference blade 23 is arranged in an image segment 24 of camera 20, in which blade 10 is also introduced.

The function of the cutting device according to the invention will be explained below.

First, the zero position of sintering plate 3 is established by means of measuring and cutting head 5. For this purpose, sintered plate 3 is driven to several positions with measuring foot 11. The zero position of sintered plate 3 is stored. Also, a possible inclination of sintered plate 3, even if it is minimal, is determined and introduced into the control of cutting device 1, in order to determine, as needed, a computer correction of the knife movement.

For cutting a predetermined breaking point in a plastic membrane or the like, particularly for covering of dashboards in motor vehicles, the plastic membrane is supported with its outside on the supporting surface of cutting device 1 formed by sintered metal plate 3. With reference to FIG. 1.1, the sintered metal plate 3 is mounted to a frame 40 having a vacuum chamber to which a vacuum channel 42 is connected. An aspiration device or vacuum source, such as pump 44, communicates with the channel. The vacuum pump 44 has a vacuum indicator 46. A vacuum monitor 48 is also provided. By activating the vacuum device, the plastic membrane or the like is aspirated or suctioned uniformly onto the sintered metal plate 3, so that all of its surface is forced against the plate. The necessary vacuum strength is verified by the vacuum monitor 48. The thickness of the plastic membrane is now checked by means of measuring foot 11. The membrane thickness must lie within a determined tolerance range, for example, between 0.9 and 1.4 mm; if it does not, the membrane is rejected. In order to check the membrane thickness, measuring foot 11 can be pressed down at a multiple number of points, for example approximately 60 points on the plastic membrane, whereby the membrane thickness is determined relative to the previously established zero position of the sintered metal plate 3. If the membrane thickness lies in the prescribed tolerance range, then the predetermined breaking point can be cut by means of cutting knife 8. For this purpose, cutting head 5 with cutting knife 8 is guided along the pre-given contour of the predetermined breaking point, whereby the vertical position of the tip of blade 10 is controlled by means of the CNC control of cutting device 1, in such a way that a residual wall thickness of the plastic membrane of 0.5 mm, for example, remains. Blade 10 is thus driven parallel to sintered plate 3. In this way, a possible previously determined inclination of sintered metal plate 3 is taken into consideration via the CNC control.

Figure 6A:
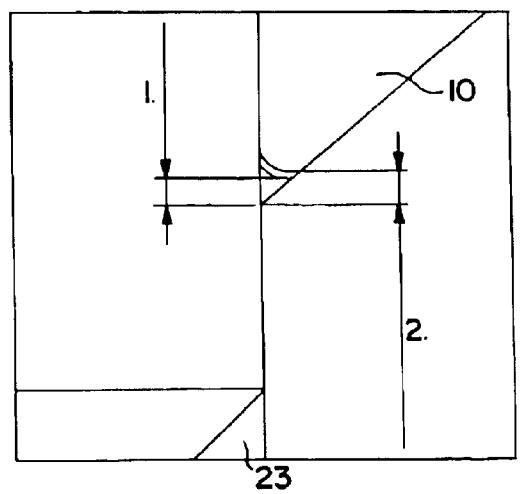
FIGS. 6a to 6c show schematically the criteria taken into consideration in the blade measurement.
Figure 6B:
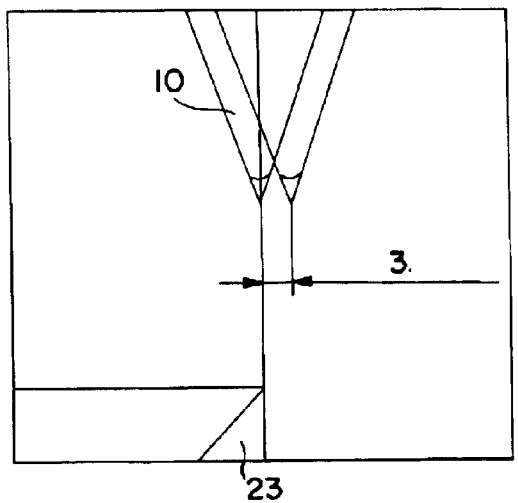
Figure 6C:
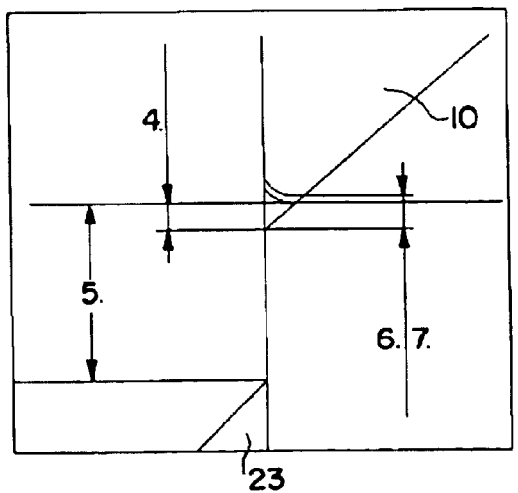

Prior to the cutting process, however, the cutting geometry of knife blade 10 is checked by means of high-resolution measuring camera 20 and reference blade 23. As is illustrated in FIGS. 6a to 6c, camera 20 first investigates the deviation of the actual point to the theoretical point of the knife edge. This evaluation is done within camera 20 by means of a test plane. The maximum wear limit is established within this test plane. The wear determined here is entered in camera 20, as long as it does not exceed the wear limit. After this measurement, the control of camera 20 receives the order to rotate the blade 10 by 90°. After the rotation of blade 10, the order is produced by the control to camera 20 to determine the displacement of cutting blade 10, and its upper limit is again tolerance-tested in camera 20. It is now internally evaluated in camera 20 on the basis of the test plane, whether the wear or the displacement exceeds the tolerance. If this is the case, camera 20 communicates via an output to the control of cutting device 1 that an error is present. This error communication is made visible in a display for the operator. Blade 10 with the error must then be exchanged or correctly inserted. If the internal evaluation of camera 20 is evaluated as good, the camera transfers to the control the correction value for the knife-edge wear. The CNC control now corrects the deviation of the knife edge by adjustment in the Z direction. By rotating the axes, the true operation of the C axis can be checked further by means of an inserted blade. In the setup operation of the camera, the reference of blade 10 to table 2 (sintered metal plate 3) is determined once by a measurement normal line (zero blade position) and by measuring blade 10 at the table level. If this reference is lost, for example, by forced action, it can be produced again without problem by the measuring normal line or the zero blade position.

During the cutting process, sliding foot 14 of measuring foot 11 slides over the plastic membrane, whereby it can compensate for possible unevenness of the plastic membrane by means of its spring load. The uneven places of the plastic membrane causing a vertical shift of sliding foot 14 are recorded, however, by measuring sensor 18, so that an error communication can be produced, if the unevenness exceeds a predetermined tolerance dimension.

After conducting the cutting process, cutting blade 10 can be checked again by means of camera 20.

If everything has run normally during the cutting process, a label is printed in a bar code printer 35 and introduced on the plastic membrane, on which the processing time, the type of predetermined breaking point introduced (for example, vehicle model, right hand drive or left hand drive) or the like can be read. If, on the other hand, an error has occurred during the cutting process, then the plastic membrane is marked by means of obliterating punch 33, so that further processing and possibly an incorporation in the motor vehicle can be prevented.

Figure 4C:
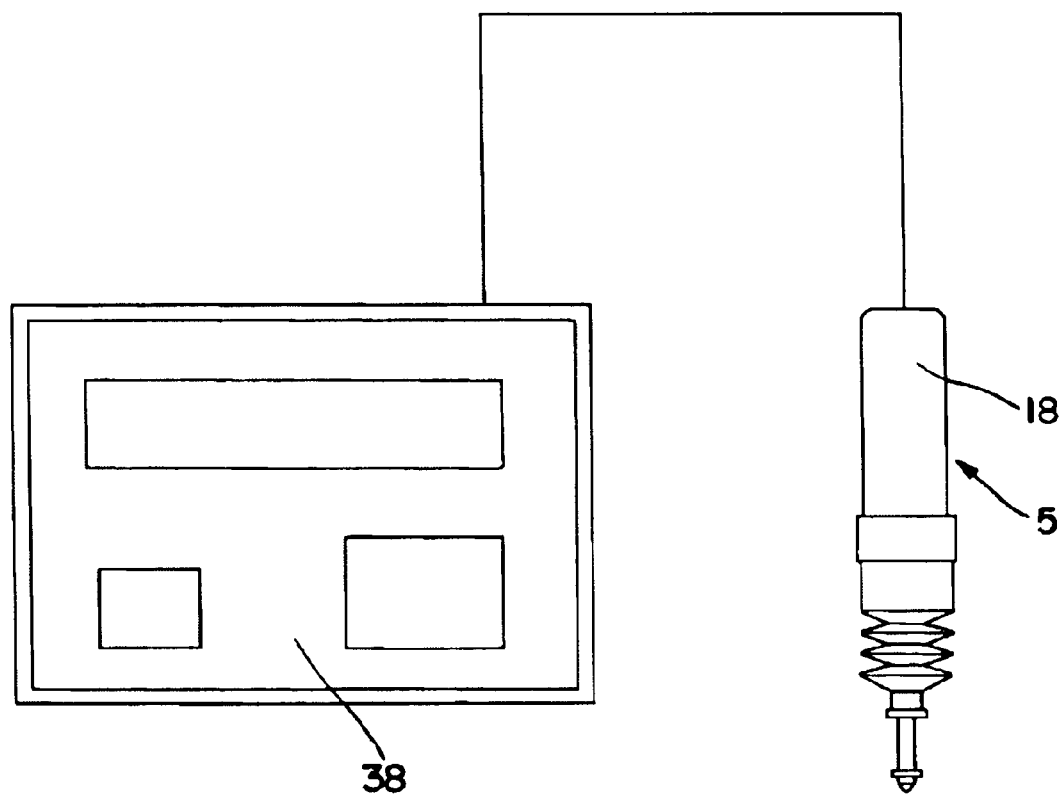
FIG. 4c shows schematically a memory device connected to the measuring and cutting head.

All data of the plastic membrane and the measurements undertaken before and during the cutting process are stored in a memory unit 38 of cutting device 1 as illustrated in FIG. 4c. The memory data are downloaded to a permanent memory, for example, a CD, at determined intervals, for example, once a week.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A cutting device comprising:
   cutting means for cutting predetermined breaking points in membrane material;
   an air permeable supporting surface for the material comprising a sintered metal plate comprising a sintered metal upper layer and a sintered metal lower layer; and
   an aspiration device for suctioning the material onto the supporting surface,
   wherein said upper layer has a grain size which is smaller than the grain size of the lower layer and said membrane material is held against said upper layer by said suctioning.

2. The cutting device according to claim 1, further comprising a frame having a vacuum connection, said sintered metal plate being embedded in said frame.

3. The cutting device according to claim 1, further comprising a vacuum monitor for checking the suction force of the aspiration device which is applied to the material.

4. The cutting device according to claim 1, further comprising a plurality of sintered metal plates defining multiple cutting regions, and wherein the cutting means comprises a cutting head which is driveable for cutting in each of said regions.

* * * * *